Patented Feb. 29, 1944

2,342,650

UNITED STATES PATENT OFFICE 2,342,650

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application September 8, 1941,
Serial No. 410,084

16 Claims. (Cl. 252—341)

This invention relates to a process for breaking petroleum emulsions, my present application being a continuation, in part, of my co-pending application, Serial No. 360,804, filed October 11, 1940, now U. S. Patent No. 2,262,741, dated November 11, 1941, which discloses a process for preventing water-in-oil type emulsions resulting from acidization of calcareous oil-bearing strata, wherein the treating agent employed is a composition of matter consisting of a mineral acid, such as hydrochloric acid, in admixture with a particular emulsion-preventing agent specifically described in said application.

In said aforementioned co-pending application the emulsion-preventing agent was referred to in view of the most suitable method of manufacture, as a condensation product. Attention is directed to the following two sentences which appear on pages 21 and 22 of the specification of said aforementioned co-pending application, Serial No. 360,804, filed October 11, 1940:

"It has been previously pointed out that a large variety of the materials herein described represent surface-active materials, or more specifically, cation-active materials. There is a wide variety of uses for such surface-acting materials." Also "The products may be used as demulsifiers in the manner that such materials are most widely used in the production of crude oil or removal of salt in refinery practice."

The subsequent subject-matter of the instant specification is substantially a verbatim copy of the subject-matter appearing in the aforementioned co-pending application, except that there is eliminated such data as is concerned primarily with acidization of calcareous structure, and reference to the matter contemplated is as a condensation product, chemical compound, or the like, rather than specific reference to it as an emulsion-preventing agent.

The condensation product or chemical compound used as the demulsifying agent in my herein disclosed process for breaking petroleum emulsions of the water-in-oil type, is obtained by reaction between a higher molecular weight monocarboxy acid or its functional equivalent, and a polymerized polyamine derived from a hydroxylated polyamine containing at least one nitrogen atom not directly linked to a hydroxy hydrocarbon radical, and preferably, at least two amino nitrogen atoms not directly linked to a hydroxy hydrocarbon radical. Such reactants are mixed together so that there is at least one mole of the high molal carboxy acid for each mole of polymerized hydroxylated polyamine; and there may be several moles of such high molal carboxy acid combined with each mole of the polymerized hydroxylated amine. Such condensation is effected by the action of the heat generally at a temperature above 100° C., and may be conducted at a temperature as high as 300° C. Generally speaking, the range of 150–175° C. represents an optimum temperature. Preferably, condensation is conducted by first polymerizing such hydroxylated amines and then condensing the polymerized hydroxylated polyamine with the selected alcohol. Polymerization catalysts consist of materials of the kind commonly employed to polymerize hydroxylated monoamine, such as triethanolamine. They include materials such as caustic soda, caustic potash, high molal amines, soaps, sodium glycerate, sodium methylate, sodium ethylate, and the like. The amounts used vary from 1% to approximately 0.1%, or even less. Polymerization is generally conducted at a temperature range of approximately 225–275° C. Constant stirring is desirable during polymerization, and condensation. Such condensation products are usually cation-active materials.

The detailed composition of the products obtained is not known, although, in a general way, ester linkages must be involved.

As indicated, an amine may act as a catalyst; or, stated another way, the hydroxylated amine of the kind employed as a reactant in the production of the emulsion-preventing agent or condensation product, may act as its own polymerization catalyst. For instance, in condensation product Examples 1–8, inclusive, as described subsequently, the added catalyst may be eliminated or reduced, with probable increased time of condensation being required. Thus, in the hereto appended claims, reference to a catalyst is intended to include the amine itself, as well as an added catalyst, if employed. For this reason many of the properties of the materials are unpredictable.

It is surprising to find that such materials are stable for an extended period of time in half-concentrated hydrochloric acid, or other similar mineral acids. It is likewise remarkable to note that such solutions in acid, and particularly in relatively low ratios, as hereinafter described, give a very pronounced lowering of the surface tension. This is especially true in such compounds or condensation products that are derived at relatively high temperatures, and especially if derived from polyamino reactants, having at least two amino nitrogen atoms not directly linked to a hydroxy hydrocarbon radical. It is difficult to indicate a detailed probable structure for such compounds which would account for their resistance to decomposition in strong acid solution.

In practising my present process for breaking petroleum emulsions of the water-in-oil type, a treating agent or demulsifier, consisting of a material of the kind above referred to is brought into contact with or caused to act upon the emulsion to be treated, in any of the various ways, or by any of the various apparatus now generally used to resolve or break petroleum emulsions with a chemical reagent, the above procedure being used alone or in combination with other demulsifying procedure, such as the electrical dehydration process.

Materials of the kind herein contemplated are derived from various reactants. One class of reactants consists of higher molecular weight carboxy acids, and particularly, monocarboxy acids or their functional equivalents, such as the acyl halide, ester, amide, etc. The expression "higher molecular weight carboxy acids" is an expression frequently employed to refer to certain organic acids, particularly monocarboxy acids, having more than 6 carbon atoms, and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, heptylic acid, caproic acid, capric acid, pimelic acid, sebacic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetylricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils, such as those mentioned; hydroxy and alpha-hydroxy higher carboxylic aliphatic and fatty acids, such as dihydroxystearic acid, dihydroxy palmitic acid, dihydroxybehenic acid, alpha-hydroxy capric acid, alpha-hydroxy lauric acid, alphahydroxy myristic acid, alpha-hydroxy cocoanut oil mixed fatty acids, alpha-hydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, carotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroabietic acid; aralkyl and aromatic acids, such as benzoic acid, Twitchell fatty acids, naphthoic acid, carboxydiphenyl pyridine carboxylic acid, hydroxybenzoic acid, and the like. Other suitable acids include phenylstearic acid, benzoylnonylic acid, cetyloxyacetic acid, chlorstearic acid, fencholic acid, cetyloxybutyric acid, etc.

Insofar that the fatty acids are preferably employed as a source of the acyl radical, obviously one need not use the fatty acids themselves, but may employ any obvious functional equivalent, such as an ester, anhydride, amide, acyl halide, etc. It is understood that in the hereto appended claims reference to formation of a condensation product being derived from an acid is intended to include such obvious functional equivalents. In such instances, instead of elimination of water, one may have some other compound, such as ammonia or hydrochloric acid, eliminated.

As has been previously indicated, the second class of reactants is obtained by polymerization of certain hydroxylated polyamines.

Such hydroxylated polyamines characterized by the presence of at least one amino nitrogen atom not directly attached to a hydroxy hydrocarbon radical, are well known compounds. They may be obtained in various ways. The commonest procedure is to treat a polyamine with an alkylene oxide or its equivalent, such as ethylene oxide, propylene oxide, glycidol, or the like. The commoner polyamines which can be so treated with an oxy-alkylating agent include the following: ethylene diamine; diethylene triamine; triethylene tetramine; tetraethylene pentamine; pentaethylene hexamine; propylene diamine; dipropylene triamine; tripropylene tetramine; tetrapropylene pentamine; pentapropylene hexamine, etc. In some instances such amines may be treated with an alkylating agent or the like so as to introduce an alkyl, aralkyl, or alicyclic radical into the compound as a substitute for an amino hydrogen atom. For instance, one may obtain diethyl tetraethylene pentamine in the conventional manner, using ethyl iodide or the like as an alkylating agent.

In any event, having selected a suitable polyamine, the product is then treated with any acceptable oxy-alkylating agent, such as ethylene oxide, propylene oxide, and the like. In view of the lower cost of ethylene oxide, and in view of the greater activity, it is most frequently employed. For instance, ethylene diamine can be treated with one mole of ethylene oxide to produce hydroxyethyl ethylene diamine. Diethylene triamine can be treated with three moles of ethylene oxide so as to yield triethanol diethylene triamine. Triethylene tetramine can be treated with four moles of ethylene oxide to yield tetraethanol triethylene tetramine. Similarly, one can obtain tetraethanol tetraethylene pentamine, or tetraethanol pentaethylene hexamine. One can employ propylene oxide or glycidol to give similar products. In view of the fact that the most inexpensive polyamine now available is tetraethylene pentamine, I prefer to treat tetraethylene pentamine with three moles, four moles, or five moles of ethylene oxide to give the corresponding triethanol, tetraethanol, and pentaethanol derivatives and to employ such derivatives.

In the manufacture of the compound or product employed as the demulsifying agent of my process, it is sometimes desirable to add a polyhydric alcohol, such as glycerol, ethylene glycol, diethylene glycol, diglycerol, propylene glycol, or the like. The effect of adding such polyhydric alcohol is essentially the same effect as would be obtained by treating the high molal alcohol with an alkylene oxide, such as ethylene oxide, propylene oxide, glycidol, or the like, or treating the unpolymerized hydroxylated amine in a similar manner, or treating the polymerized hydroxylated amine in a kindred fashion.

In view of the numerous reactants which have been indicated, it is obvious that one can obtain a variety of condensation products or emulsion-preventing reagents. If a compound or emulsion-preventing agent is not soluble enough, its solubility, or the solubility of its salt, can be increased in various manners, for instance:

(a) Employ a monocarboxy acid having a lower molecular weight;

(b) Use fewer moles of acid per mole of original unpolymerized polyamine;

(c) Select as a raw material an amine having a greater number of amino nitrogen atoms;

(d) Select as a raw material an amine having a greater number of hydroxy hydrocarbon radicals;

(e) Select as an amine a compound having both an increased number of nitrogen atoms and an increased number of hydroxy hydrocarbon radicals;

(f) Add a polyhydric alcohol, such as glycerol, at some selected stage subsequently indicated; and (g) Vary the degree of polymerization of the hydroxylated amine in the manner subsequently indicated.

Inversely, it will sometimes happen that the condensation product or emulsion-preventing agent is too soluble; or, to state the matter another way, it does not possess sufficient surface activity for the purpose intended. In such instances it may be desirable to decrease the hydrophile properties. It is unnecessary to remark that this requires only a reversal of one or more of the procedures previously enumerated. It is believed that in view of what has been said, the compounds of the kind contemplated can be prepared without further directions or illustrations. However, for the purpose of indicating the preferable type of condensation product or emulsion-preventing agent, attention is directed to the following examples:

*Polymerized hydroxylated polyamine—Example 1*

Triethylene tetramine is treated with four moles of ethylene oxide to produce tetraethanol triethylene tetramine. Approximately three-fourths of a percent of caustic soda is added to this material by weight and the hydroxylated amine is heated for approximately two to four hours at about 245–260° C. The mass is stirred constantly and any distillate is condensed and reserved for re-use after an intermediate re-running step. As polymerization takes place, as indicated by elimination of water and increase in viscosity of the residual mass, cryoscopic molecular weight determinations are made on the polyamine or a suitable salt, such as the acetate, or the like, and polymerization is stopped when such molecular weight determinations indicate that the material based on average values is largely dimeric.

*Polymerized hydroxylated polyamine—Example 2*

The same procedure is employed as in the previous example, except that heating is conducted for approximately 1–3 hours longer. Tests are made in the same manner as previously indicated, and polymerization is stopped when determinations indicate that the average molecular weight is equivalent to a trimeric product.

*Polymerized hydroxylated polyamine—Example 3*

The same procedure is followed as in Example 2, preceding, except that a slightly higher temperature is employed, i. e., about 10° higher, and if need be, a slightly longer time; and the process is continued until the product indicates an average molecular weight equal to or exceeding that of a tetramer.

*Polymerized hydroxylated polyamine—Example 4*

The preceding examples are repeated, adding one mole of glycerol for each mole of hydroxylated amine employed.

*Polymerized hydroxylated polyamine—Example 5*

Examples 1–3, inclusive, are repeated, adding two moles of glycerol for each mole of hydroxylated polyamine employed.

*Polymerized hydroxylated polyamine—Example 6*

Tetraethanol pentaethylene hexamine is substituted for tetraethanol triethylene tetramine in Examples 1–5.

*Polymerized hydroxylated polyamine—Example 7*

Tetraethanol tetraethylene pentamine is substituted for tetraethanol pentaethylene hexamine in the preceding example.

*Polymerized hydroxylated polyamine—Example 8*

Pentaethanol tetraethylene pentamine is substituted for tetraethanol tetraethylene pentamine in the preceding example.

*Polymerized hydroxylated polyamine—Example 9*

Hexa-ethanoltetraethylene pentamine is substituted for pentaethanol tetraethylene pentamine in the previous example.

The mixture of such reactants, i. e., the polymerized hydroxylated amine and the high molal carboxy acid or its equivalent, are prepared in such ratio that there is present at least one mole of the high molal fatty acid or its equivalent for each mole of polymerized amine. My preference is to use a dimeric, trimeric, or tetrameric form of the polymerized hydroxylated amine. My preference also is to use a fatty acid, rather than any other type of monocarboxy acid, and particularly to employ unsaturated fatty acids, such as soyabean fatty acids, teaseed oil fatty acids, corn oil fatty acids, and the like. The most desirable unsaturated fatty acid appears to be ricinoleic acid. It is used, if desired, in a more available form, to wit, the glyceride. In other words, in subsequent Example 1 and succeeding examples, it is really preferable to substitute one pound mole of triricinolein (castor oil) for three pound moles of ricinoleic acid.

The temperature of condensation has previously been indicated. In a general way, it is above 100° C.; but any temperature below the point of decomposition of the hydrotropic condensation materials may be employed. Although the preferred range indicated in succeeding examples is 150-175° C., in many instances very valuable reagents are obtained by using a considerably higher temperature, to wit, 250-300° C.

Condensation product—Example 1

A mixture is prepared, using one pound mole each of the following: ricinoleic acid and a material of the kind exemplified by polymerized hydroxylated polyamine, Example 1. The products are mixed and stirred constantly, holding the temperature at approximately 150-175° C., until no unreacted high molal acid remains. The bulk of such high molal acid generally disappears within two to three hours; but sometimes it is necessary to heat from 4 to 6, or even 10, hours to obtain substantially complete reaction. The final completion of reaction is indicated in various ways, and usually by the fact that the product gives a clear solution in dilute acetic acid.

Condensation product—Example 2

One pound mole of ricinoleic acid in Example 1 above is replaced by two pound moles.

Condensation product—Example 3

Oleic acid is used instead of ricinoleic acid in Examples 1 and 2, preceding.

Condensation product—Example 4

Abietic acid is used instead of ricinoleic acid in Examples 1 and 2, preceding.

Condensation product—Example 5

Naphthenic acid is used instead of ricinoleic acid in Examples 1 and 2, preceding.

Condensation product—Example 6

The examples of the type previously indicated are repeated, with the addition of one pound mole of glycerol for each pound mole of the high molal alcohol.

Condensation product—Example 7

Example 6 is repeated, using two pound moles of glycerol in each instance instead of one pound mole.

Condensation product—Example 8

Examples 1-7, preceding, are repeated, using polymerized hydroxylated polyamines, Examples 2-9, instead of Example 1, as in the previous examples.

In the hereto appended claims, reference to the use of the condensation product is intended to include the base form, i. e., the chemical combination of water, and also the salt form such as the lactate, acetate, citrate, or the like.

Having thus described my invention, what I claim as new and desire to secure by Letters Patent is:

1. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of a higher molecular weight monocarboxy acid containing at least 8 carbon atoms.

2. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of a detergent-forming acid containing at least 8 carbon atoms.

3. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of a fatty acid containing at least 8 carbon atoms.

4. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of an unsaturated fatty acid containing at least 8 carbon atoms.

5. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least two amino nitrogen atoms not directly linked to a hydroxy-hydrocarbon radical, and at least one mole of an unsaturated fatty acid containing at least 8 carbon atoms.

6. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyethylene amine containing at least two amino nitrogen atoms not directly linked to a hydroxy-hydrocarbon radical, and at least one mole of an unsaturated fatty acid containing at least 8 carbon atoms.

7. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from tetraethanol tetraethylene pentamine and at least one mole of an unsaturated fatty acid containing at least 8 carbon atoms.

8. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from pentaethanol tetraethylene pentamine and at least one mole of an unsatuated fatty acid containing at least 8 carbon atoms.

9. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of a higher molecular weight monocarboxy acid containing at least 8 carbon atoms, and at least one mole of a polyhydric alcohol.

10. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of a detergent-forming acid containing at least 8 carbon atoms, and at least one mole of a polyhydric alcohol.

11. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of a fatty acid containing at least 8 carbon atoms, and at least one mole of a polyhydric alcohol.

12. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of an unsaturated fatty acid containing at least 8 carbon atoms, and at least one mole of a polyhydric alcohol.

13. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least two amino nitrogen atoms not directly linked to a hydroxy-hydrocarbon radical, at least one mole of an unsaturated fatty acid containing at least 8 carbon atoms, and at least one mole of a polyhydric alcohol.

14. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyethylene amine containing at least two amino nitrogen atoms not directly linked to a hydroxy-hydrocarbon radical, at least one mole of an unsaturated fatty acid containing at least 8 carbon atoms, and at least one mole of a polyhydric alcohol.

15. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from tetraethanol tetraethylene pentamine, at least one mole of an unsaturated fatty acid containing at least 8 carbon atoms, and at least one mole of a polyhydric alcohol.

16. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from pentaethanol tetraethylene pentamine, at least one mole of an unsaturated fatty acid containing at least 8 carbon atoms, and at least one mole of a polyhydric alcohol.

MELVIN DE GROOTE.